(12) United States Patent
Zhuang

(10) Patent No.: US 12,539,142 B2
(45) Date of Patent: Feb. 3, 2026

(54) SYSTEM AND METHOD FOR IMPLANTING ELECTRODE ARRAY IN A BIOLOGICAL ORGAN

(71) Applicant: Jun Zhuang, Seattle, WA (US)

(72) Inventor: Jun Zhuang, Seattle, WA (US)

( * ) Notice: Subject to any disclaimer, the term of this patent is extended or adjusted under 35 U.S.C. 154(b) by 681 days.

(21) Appl. No.: 17/866,480

(22) Filed: Jul. 16, 2022

(65) Prior Publication Data

US 2024/0016517 A1    Jan. 18, 2024

(51) Int. Cl.
*A61B 90/11* (2016.01)
*A61B 17/34* (2006.01)
*A61B 17/00* (2006.01)

(52) U.S. Cl.
CPC .......... *A61B 17/3468* (2013.01); *A61B 90/11* (2016.02); *A61B 2017/00017* (2013.01); *A61B 2017/00477* (2013.01); *A61B 2017/00743* (2013.01); *A61B 2017/00876* (2013.01)

(58) Field of Classification Search
CPC .................. A61N 1/37514; A61N 1/36; A61N 1/36014–36034; A61N 1/3605–36121; A61N 1/0526–0539; A61N 1/04–0469; A61N 1/372; A61N 1/375–3758; A61M 5/3287; A61M 2005/3289; A61B 90/10–25; A61B 2090/101–103; A61B 34/30–37; A61B 2034/301–306; A61B 17/3403–3415; A61B 17/17–1792; A61B 2017/3405–3413; A61B 5/24–248; A61B 5/388; A61B 5/25–297; A61B 5/282; A61B 5/287; A61B 2562/04; A61B 2562/16; A61B 2562/164
See application file for complete search history.

(56) References Cited

U.S. PATENT DOCUMENTS

| | | | | |
|---|---|---|---|---|
| 5,423,832 | A * | 6/1995 | Gildenberg | A61B 90/10 606/130 |
| 5,711,299 | A * | 1/1998 | Manwaring | A61B 34/20 600/117 |
| 8,747,418 | B2 * | 6/2014 | Qureshi | F16M 11/14 248/161 |
| 10,076,387 | B2 * | 9/2018 | Nelson | A61B 17/3468 |
| 2003/0208188 | A1 * | 11/2003 | Ritter | A61B 34/70 606/1 |
| 2013/0138117 | A1 * | 5/2013 | Abbott | A61B 34/70 606/129 |
| 2016/0249991 | A1 * | 9/2016 | Glozman | A61B 17/3403 606/130 |

* cited by examiner

*Primary Examiner* — Elizabeth Houston
*Assistant Examiner* — Jonathan A Hollm
(74) *Attorney, Agent, or Firm* — Alloy Patent law; Walker Griffin Weitzel

(57) ABSTRACT

Presented is a system and method for implanting a flexible electrode array in a biological organ. The system includes an electrode implant tool that includes an elongate rod and an electrode implant assembly having a plurality of attachment members. The electrode implant assembly further includes a ring member connected to each of the attachment members. A variable magnetic field generator is arranged in the ring member. The system uses electromagnetic force to temporarily strengthen the flexible electrodes allowing the penetration into the brain.

17 Claims, 15 Drawing Sheets

SYSTEM AND METHOD FOR IMPLANTING ELECTRODE ARRAY IN A BIOLOGICAL ORGAN

FIELD OF INVENTION

The present invention generally relates to implantable biomedical electrodes and more particularly, it pertains to a system and method for implanting flexible electrodes into the brain.

BACKGROUND

Implantable microelectrodes that convert neural signals to electronic signals are among the most widely applied tools for in vivo recordings of neural activities from peripheral and central nervous systems. Further, the microelectrodes implanted in the central nervous system, in particular the brain, are useful for the clinical treatment of neurological disorders, such as Parkinson's disease.

A reliable and robust brain-machine interface using penetrating electrodes requires long-term stability for extracting brain activity signals. Traditional rigid electrodes (e.g., metal electrodes and silicon probes) suffer from the problem of degrading signal quality over time due to the relative movement between the electrodes and the brain. Conventional implantable microelectrodes are based on metals or silicon with higher elastic moduli in the range of 10^2 gpa, wherein the elastic moduli of peripheral and central nervous systems is significantly less in number and are in the mpa to kpa range. The large mechanical mismatch between the implanted rigid microelectrodes and neural tissues of peripheral and central nervous systems results in tissue-electrode micromotion and chronic inflammatory responses.

The polymer based flexible electrodes overcome this difficulty by having similar rigidity to the brain. This allows the electrodes to move with the brain thus reducing the relative movement. However, given the flexibility, these electrodes are usually not strong enough to penetrate the brain surface by themselves during implantation. Thus, the accurate in vivo positioning of flexible microelectrodes presents a challenge because of their susceptibility to buckling instability under in-plane compression.

Various devices have been attempted in the prior art to solve the above-mentioned problem. A variety of approaches, including syringe injection, removable insertion shuttles, polymer molds, and integrated microfluidic devices have been used to temporarily increase the rigidity of flexible microelectrodes for in vivo positioning.

Considering various approaches to solve the above mentioned problem, the flexible electrode is pulled by a rigid needle-like probe (musk et al., an integrated brain-machine interface platform with thousands of channels; 2019; and luan et al., ultraflexible nanoelectronic probes form reliable, glial scar-free neural integration; 2017), the flexible electrode is glued to a rigid probe by dissolvable material (chung et al., high-density, longlasting, and multi-region electrophysiological recordings using polymer electrode array(s); 2019; zhao et al., parallel, minimally-invasive implantation of ultra-flexible neural electrode array(s); 2019; lu et al., soft and mri compatible neural electrodes from carbon nanotube fibers; 2019), the flexible electrode is injected by a syringe (liu et al., syringe-injectable electronics; 2015; schuhmann et al., syringe-injectable electronics with a plug-and-play input/output interface; 2017; yang et al., bioinspired neuron-like electronics; 2019), the flexible electrode is inserted by fluidic actuation (vitale et al., fluidic microactuation of flexible electrodes for neural recording; 2018), and the flexible electrode is bundled and strengthened by dissolvable material (guan et al., elastocapillary self-assembled neuro-tassels for stable neural activity recordings; 2019).

The approaches of the flexible electrode pulled by a rigid needle-like probe, the flexible electrode glued to a rigid probe by dissolvable material, and the flexible electrode injected by a syringe introduce extra rigid material along the insertion path, increasing the damage to the tissue under recording. The approach of flexible electrodes inserted by fluidic actuation is difficult to scale up for multiple channels. Furthermore, the approach of flexible electrode bundled and strengthened by dissolvable material utilizes electrode bundles. However, the electrode bundles were significantly thicker than a single electrode thread potentially introducing extra tissue damage.

In yet another approach to solve the problem of implanting the flexible electrodes, magnetic actuation of flexible microelectrode array(s) has been proposed (gao et al: Magnetic actuation of flexible microelectrode array(s) for neural activity recordings; 2019). However, this approach rely on using permanent magnets to enable the movement of the flexible electrodes. The permanent magnets could only generate a non-adjustable magnetic field which is not ideal for in vivo positioning of flexible microelectrodes. To avoid colliding with the biological head, the permanent magnets are placed below the jaw. Since the magnetic force decreases quadratically to the distance between two magnets, the magnetic force generated in this approach is too weak to let electrode penetrate the brain. In practical use, the effective tissue penetration of the brain by using the flexible microelectrodes requires variable force considering the variable rigidity of brain tissue and other complexities associated with effective in vivo positioning such as but not limited to avoiding collision with unintended crucial sections of biological head such as but not limited to: skull and so on. Further, this approach does not involve a suitable tool ergonomically designed to enable in vivo positioning of flexible microelectrodes.

Thus, the existing prior art(s) do not provide an effective solution due to their cumbersome design and difficulty in use. Thus, there is a need for a system and method that uses electromagnetic force to temporarily strengthen the flexible electrodes allowing the penetration into the brain while avoiding colliding with the skull.

SUMMARY

Before the present systems and methods are described, it is to be understood that this application is not limited to the particular systems, and methodologies described, as there can be multiple possible embodiments that are not expressly illustrated in the present disclosures. It is also to be understood that the terminology used in the description is for the purpose of describing the particular versions or embodiments only, and is not intended to limit the scope of the present application.

Embodiments of the present invention disclose a system for implanting at least one flexible electrode array in a biological organ, the system comprising an electrode implant tool, comprising: An elongate rod comprising a first end and an opposite second end; an electrode implant assembly comprising a plurality of attachment members projecting from the second end of the elongate rod; wherein the electrode implant assembly further comprises a ring member connected to each of the plurality of attachment members; a variable magnetic field generator arranged in the ring member; a plurality of radial arms; wherein each of the plurality of radial arms comprises a first end connected to the electrode implant assembly and an opposite cantilevered second end; an electrode holder assembly, removably positioned on the top of the cantilevered second end of the plurality of radial arms; wherein the electrode holder assembly, comprises a plurality of small teeth elements disposed in the outer periphery of the electrode holder assembly, wherein the electrode holder assembly further comprises a central hole for holding at least one flexible electrode array(s). A ferromagnetic metal retainer is removably positioned on top of the electrode holder assembly.

In an embodiment, the electrode implant assembly could be selectively moved relative to the electrode holder assembly to bring the electrode implant assembly, in either a first position or a second position; wherein in the first position, each of the plurality of small teeth elements is positioned on top of a cantilevered second end of one of the plurality of radial arms such that the plurality of small teeth elements at least substantially overlies on the second end of the plurality of radial arms; wherein in the second position, the plurality of small teeth elements does not overlie on the second end of the plurality of radial arms.

In an embodiment, the electrode implant assembly could be selectively moved in either a first position or a second position by rotating the electrode implant assembly, relative to the electrode holder assembly.

In an embodiment, the electrode implant assembly, could be selectively moved in either a first position or a second position by slidably moving the electrode implant assembly, relative to the electrode holder assembly.

In an embodiment, the first end of the elongate rod is configured to be connected to a surgical manipulator.

In an embodiment, the periphery of the ring member comprises two flange portions; wherein the variable magnetic field generator is arranged in a gap formed between the two flange portions of the periphery of the ring member.

In an embodiment, the plurality of attachment members projecting from the elongate rod is more than one in number.

In an embodiment, the plurality of radial arms is more than one in number.

In an embodiment, the electrode holder assembly comprises a plurality of large teeth elements disposed of in the outer periphery of the electrode holder assembly.

In an embodiment, each of the plurality of large teeth elements comprises a fastener hole to removably connect the plurality of large teeth elements with the downstream data acquisition system.

In an embodiment, the variable magnetic field generator is configured to generate an adjustable magnetic field by controlling the electric current supplied to the variable magnetic field generator.

In an embodiment, the variable magnetic field generator is selected from a group consisting of an electromagnetic coil, a current carrying conductor.

In an embodiment, the flexible electrode array(s) includes a magnetic material positioned at an unsupported tip of the flexible electrode array(s).

In an embodiment, the cantilevered second end of the plurality of radial arms is positioned such that the cantilevered second end of the plurality of radial arms is at a higher elevation than the variable magnetic field generator arranged in the periphery of the ring member.

Various objects, features, aspects, and advantages of the present invention will become more apparent from the following detailed description of the embodiments of the invention, along with the accompanying drawings in which like numerals represent like components.

BRIEF DESCRIPTION OF THE DRAWINGS

The foregoing summary, as well as the following detailed description of preferred embodiments, is better understood when read in conjunction with the appended drawings. There is shown in the drawings of example embodiments, however, the application is not limited to the specific system and method disclosed in the drawings.

DETAILED DESCRIPTION

Some embodiments, illustrating its features, will now be discussed in detail. The words "comprising," "having," "containing," and "including," And other forms thereof, are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," And "the" Include plural references unless the context clearly dictates otherwise. Although any methods and systems similar or equivalent to those described herein can be used in the practice or testing of embodiments, the preferred methods, and systems are now described. The disclosed embodiments are merely exemplary.

The various features and embodiments of the present invention for a system and method for implanting at least one flexible electrode array 160 in a biological organ 200 will now be described in conjunction with the accompanying figures, namely FIGS. 1-15.

Figure 1:
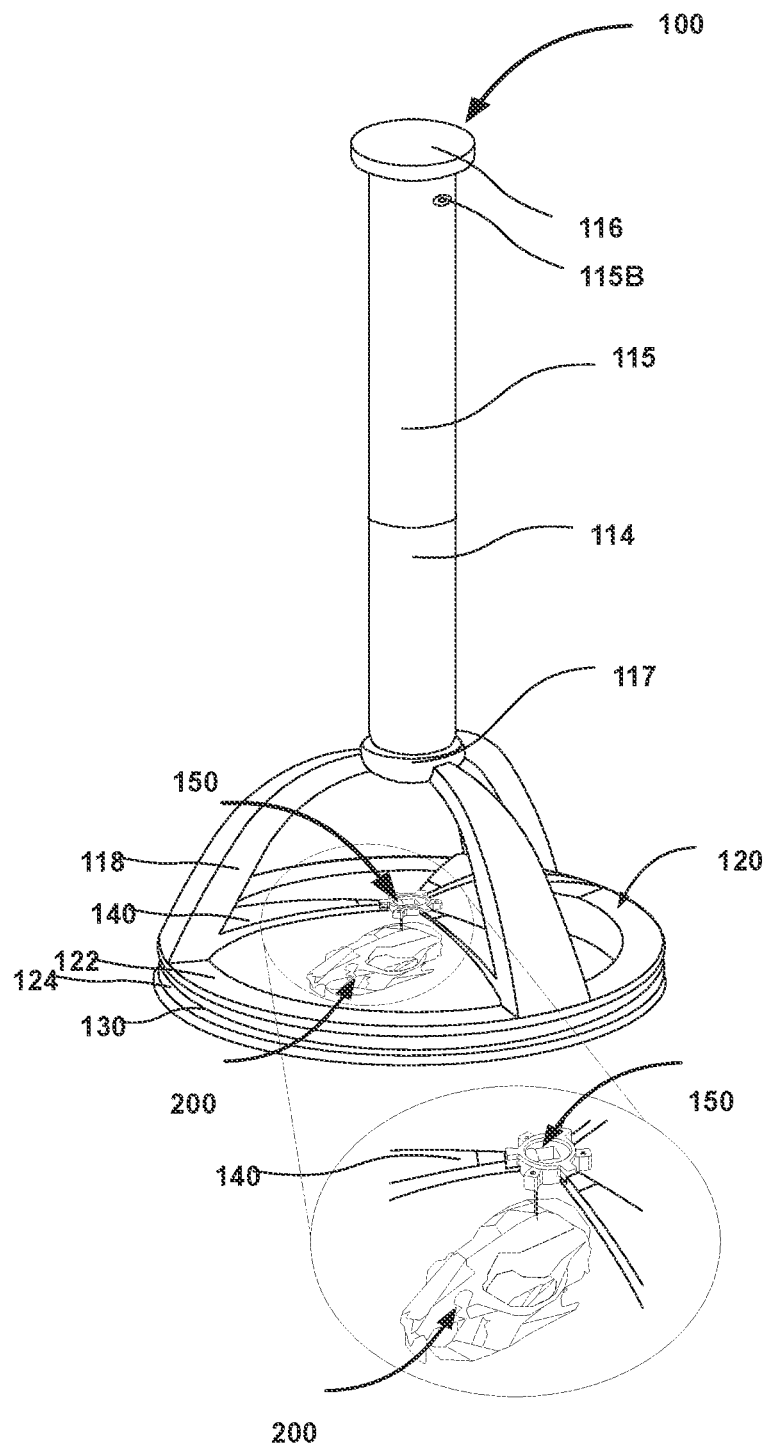
FIG. 1 illustrates a perspective view of an electrode implant tool removably holding an electrode holder assembly, according to an embodiment of the present invention.

FIG. 1 illustrates a perspective view of an electrode implant tool 100 removably holding an electrode holder assembly 150, according to an embodiment of the present invention. The electrode implant tool 100 is configured for implanting at least one flexible electrode array 160 in a biological organ 200. The biological organ 200 could include but is not limited to primate brain, human brain, rodent brain, and so on.

Figure 2:
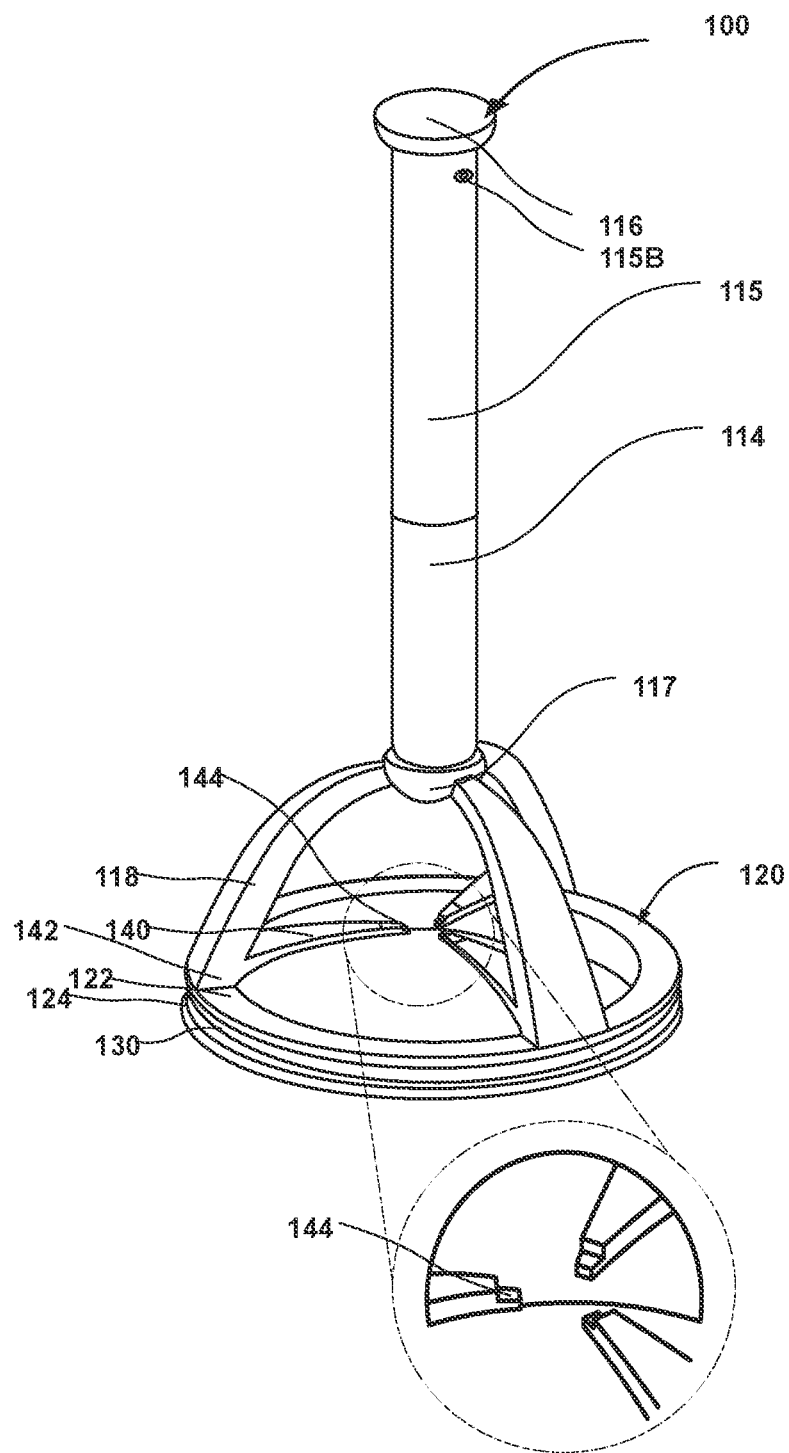
FIG. 2 illustrates a perspective view of the electrode implant tool of FIG. 1, wherein electrode holder assembly is not shown for simplicity and ease of understanding.

As shown in FIG. 1, the electrode implant tool 100 comprises an elongate rod 114 comprising a first end 116 and an opposite second end 117. In an embodiment, the first end 116 of the elongate rod 114 is configured to be connected to a surgical manipulator 220 (not shown in figures). In another embodiment, the first end 116 of the elongate rod 114 is configured to be manually operated by an operator. The electrode implant tool 100 further comprises an electrode implant assembly 120 which comprises a plurality of attachment members 118 projecting from the elongate rod 114. The electrode implant assembly 120 further comprises a ring member 122 connected to each of the plurality of attachment members 118. The ring member 122 is dimensioned so that ring member 122 can easily fit the subject's head, in particular biological organ 200 (brain). A variable magnetic field source 130 is arranged in the periphery 124 of the ring member 122. In an embodiment as seen in FIG. 1-2, the variable magnetic field source 130 is an electromagnetic coil 130. The electromagnetic coil 130 is configured to generate an adjustable magnetic field by controlling the electric current supplied to the electromagnetic coil 130. In another embodiment (not shown in figures), the variable magnetic field source 130 is a current carrying conductor. As seen in FIGS. 1-2, a plurality of radial arms 140 is connected to the plurality of attachment members 118 of the electrode implant assembly 120. Each of the plurality of radial arms 140 comprises a first end 142 connected to one of the plurality of attachment members 118 of the electrode implant assembly 120 and an opposite cantilevered second end 144. Wherein the cantilevered second end 144 of the plurality of radial arms 140 is positioned such that the cantilevered second end 144 of the plurality of radial arms 140 is at a higher elevation than the variable magnetic field generator 130 arranged in the periphery 124 of the ring member 122. As shown in FIG. 1, an electrode holder assembly 150 is removably positioned on the top of the cantilevered second end 144 of the plurality of radial arms 140, wherein the electrode holder assembly 150 will be described in greater detail in the below description.

Figure 3:
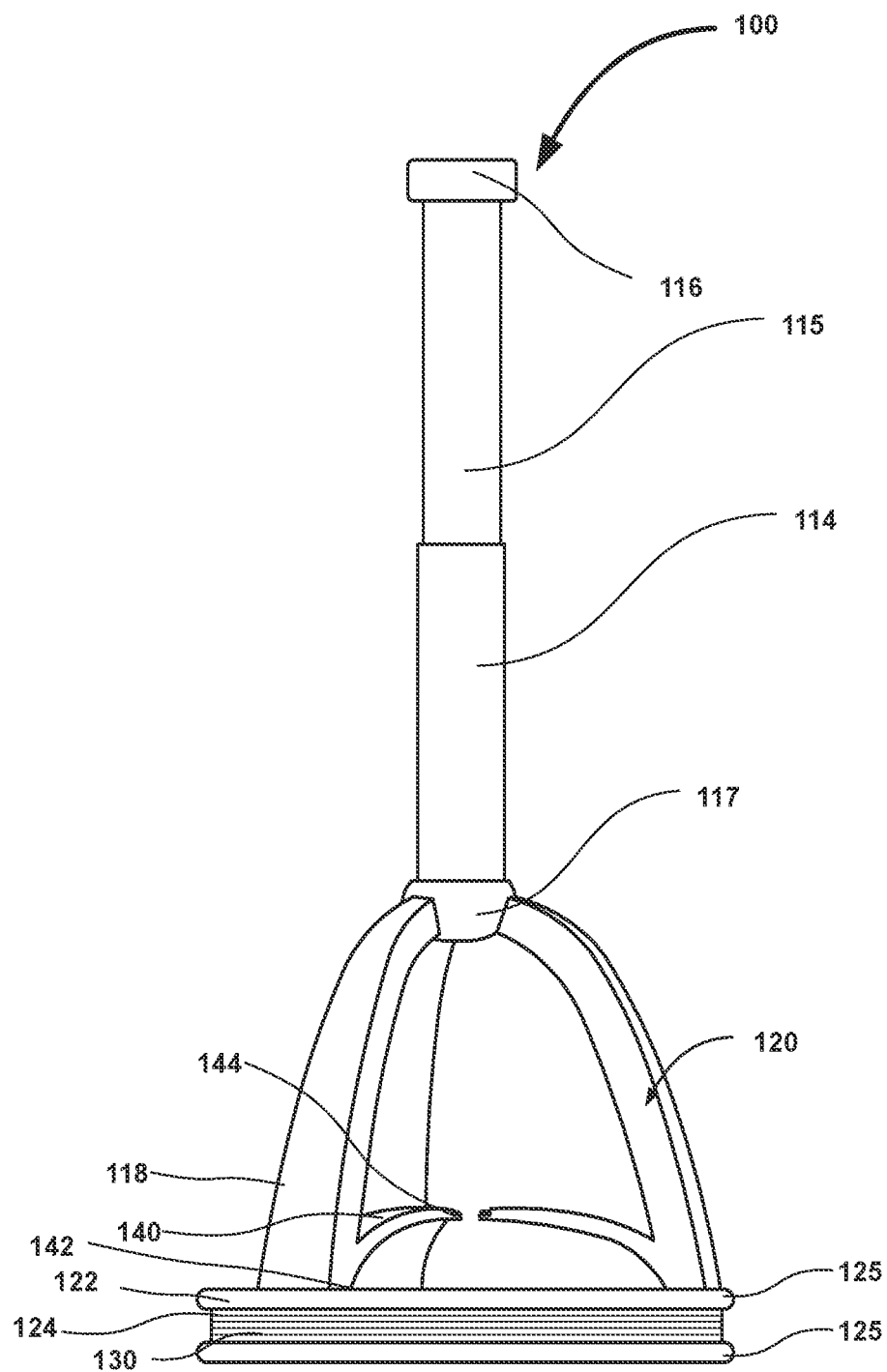
FIG. 3 illustrates a side view of the electrode implant tool of FIG. 2.
Figure 4:
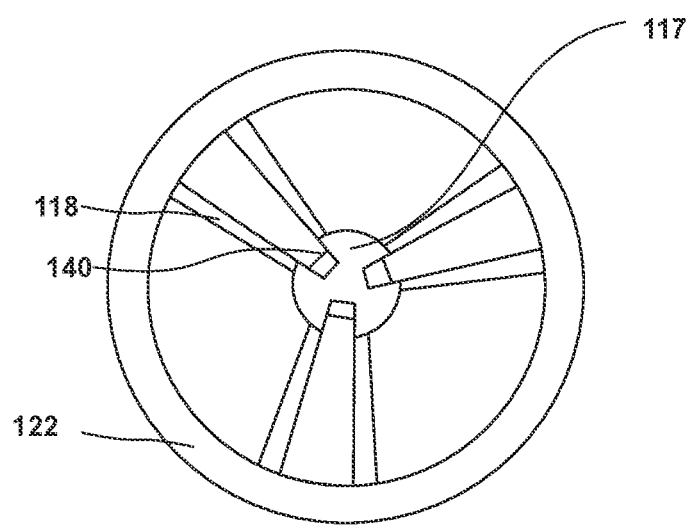
FIG. 4 illustrates a bottom view of the electrode implant tool of FIG. 2.

FIG. 2, FIG. 3 and FIG. 4 depict a perspective view, a side view, and a bottom view of the electrode implant tool 100 respectively. Referring to FIGS. 2-4, the periphery 124 of the ring member 122 comprises two flange portions 125 and the variable magnetic field generator 130 is arranged in a gap formed between the two flange portions 125 of the periphery 124 of the ring member 122. As seen in FIGS. 2-4, the plurality of attachment members 118 projecting from the elongate rod 114 is three in number. However, it should be understood that the plurality of attachment members 118 could be any arbitrary number more than one. Further as seen in FIGS. 2-4, the plurality of radial arms 140 is three in number. However, it should be understood that the plurality of radial arms 140 could be any arbitrary number more than one. The variable magnetic field generator 130 is configured to generate an adjustable magnetic field by controlling the electric current supplied to the variable magnetic field generator 130. The elongate rod 114 comprises a rotation tube 115 to enable removable connection of the elongate rod 114 with the surgical manipulator 220. A set screw 115A (not shown in figures) is removably secured in a set screw hole 115*b*; wherein the screw hole 115*b* is formed in the rotation tube 115. An operator can removably connect the elongate rod 114 with the surgical manipulator 220 by rotating set screw 115A (not shown in figures) relative to the set screw hole 115*b* in a specific direction and vice versa.

Figure 5:
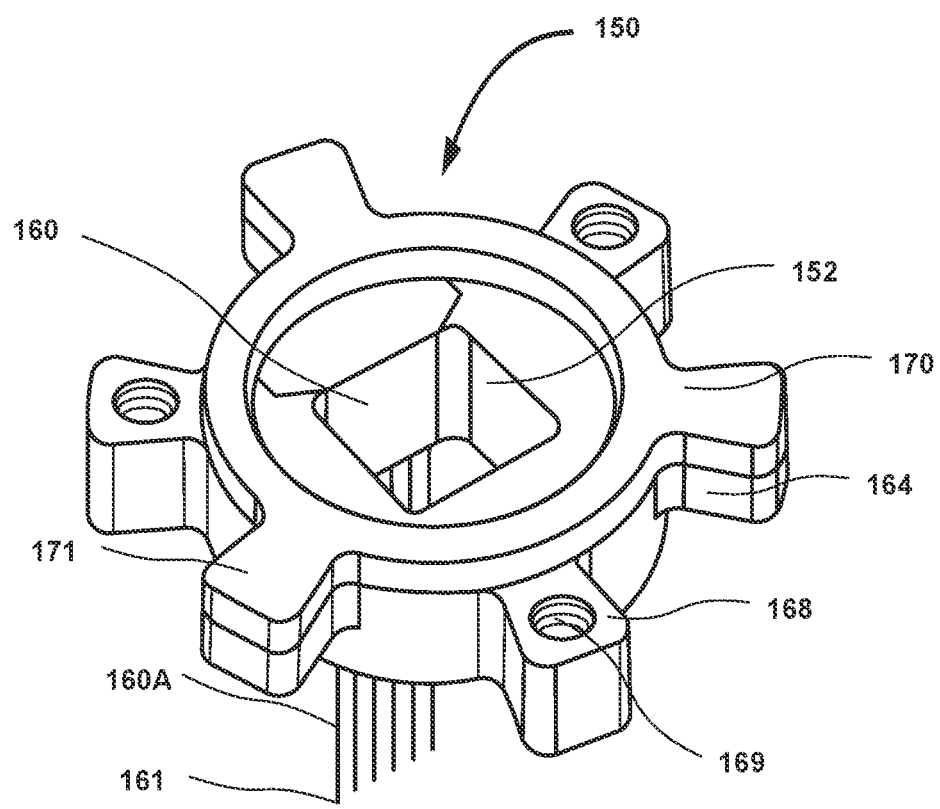
FIG. 5 illustrates a perspective view of the electrode holder assembly of FIG. 1, according to an embodiment of the present invention.
Figure 6:
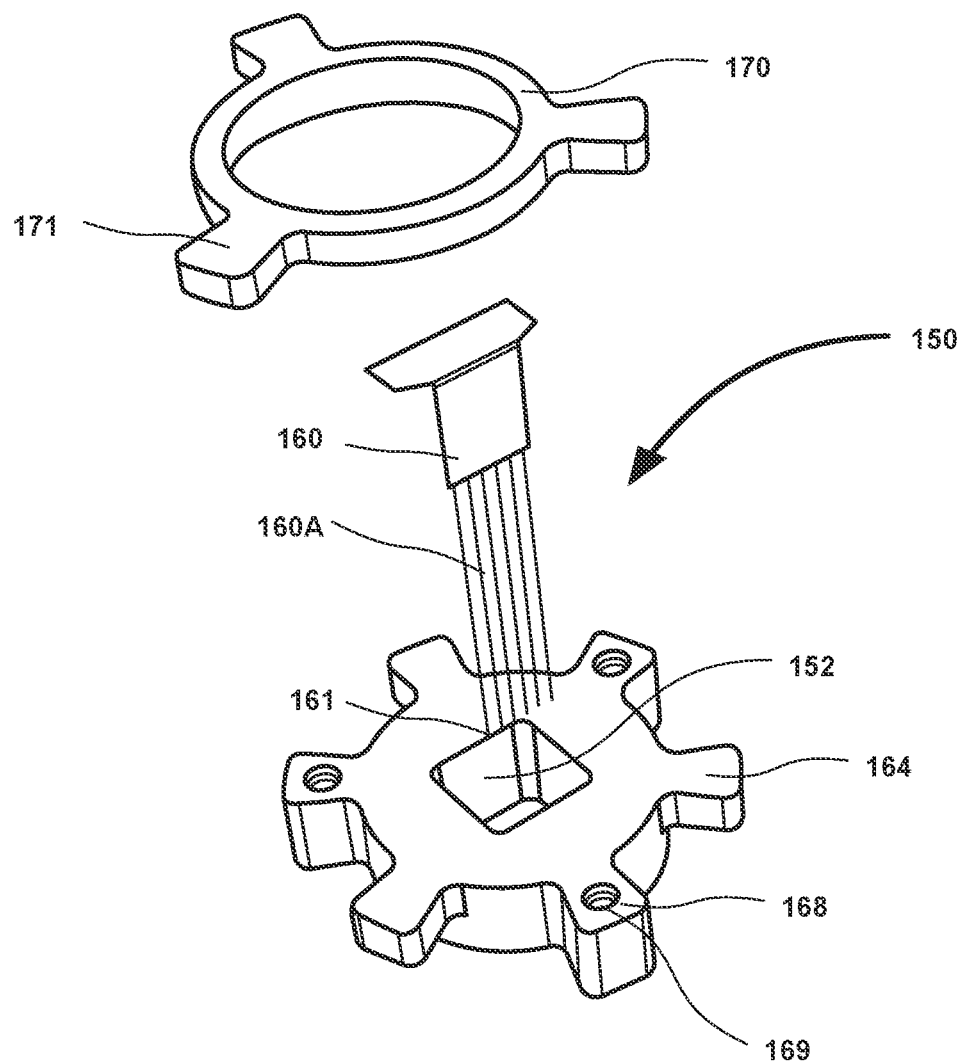
FIG. 6 illustrates an exploded view of the electrode holder assembly of FIG. 5.
Figure 7:
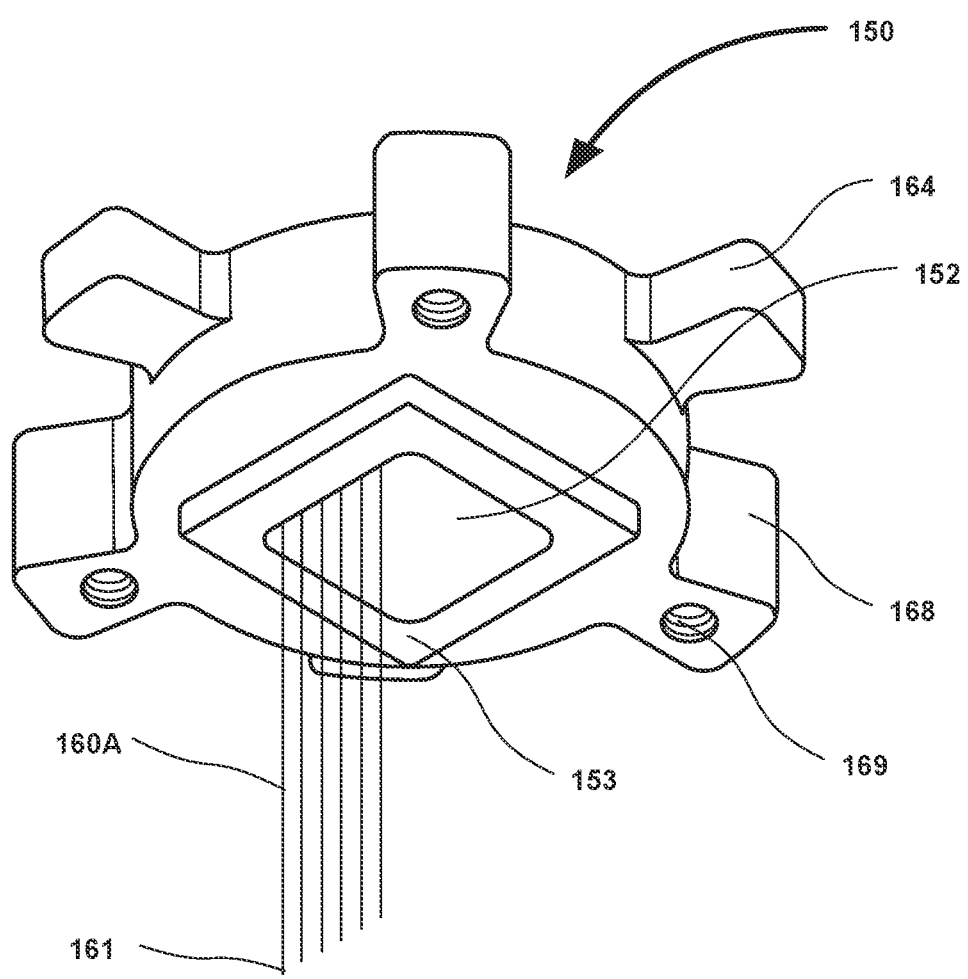
FIG. 7 illustrates a perspective bottom view of the electrode holder assembly of FIG. 5.

Referring to FIGS. 5-7, an electrode holder assembly 150 is removably positioned on the top of the cantilevered second end 144 of the plurality of radial arms 140. The electrode holder assembly 150 comprises a plurality of small teeth elements 164 disposed of in the outer periphery of the electrode holder assembly 150. The electrode holder assembly 150 further comprises a central hole 152 for holding at least one flexible electrode array(s) 160. The central hole 152 is substantially square-shaped. However, it should be understood that the shape of the central hole 152 could have any shape including but not limited to: a circle, hexagon, triangle, and so on. An extruding element 153 is connected at the bottom of the electrode holder assembly 150.

A ferromagnetic metal retainer 170 is removably positioned on top of the electrode holder assembly 150. The ferromagnetic metal retainer 170 comprises a plurality of flanges 171 which are movably positioned (overlies) on the top of the plurality of small teeth elements 164. The flexible electrode array(s) 160 includes a magnetic material positioned at an unsupported tip 161 of the flexible electrode array(s) 160. The magnetic material could include but is not limited to iron, nickel, cobalt, metal alloys and so on. The flexible electrode array(s) 160 can have at least one shank 160A and each shank(s) 160A may have multiple channels. The upper part of the flexible electrode array(s) 160 is the printed pin out connectors which can be bent over and attached permanently to the upper surface of the electrode holder assembly 150. The shank(s) 160A extend downward through the central hole 152 of the electrode holder assembly 150. The electrode holder assembly 150 further comprises a plurality of large teeth elements 168 disposed of in the outer periphery of the electrode holder assembly 150. Each of the plurality of large teeth elements 168 comprises a fastener hole 169 to removably connect the plurality of large teeth elements 168 with a downstream data acquisition system (not shown in figures). The electrode holder assembly 150 and the ferromagnetic metal retainer 170 are substantially circular in shape as seen in FIG. 5, however other shapes should also be envisioned including but not limited to triangular, square, hexagon, octagon, and so on. The overall thickness of the large teeth elements 168 is set larger than the small teeth elements 164.

Referring to FIGS. 1-7, the electrode implant assembly 120 could be selectively moved relative to the electrode holder assembly 150 to bring the electrode implant assembly 120 in either a first position (FIG. 1) or a second position (not shown in figures).

In the first position as shown in FIG. 1, each of the plurality of small teeth elements 164 is positioned on top of the cantilevered second end 144 of one of the plurality of radial arms 140 such that the plurality of small teeth elements 164 at least substantially overlies on the second end 144 of the plurality of radial arms 140 such that the plurality of small teeth elements 164 at least partially contacts the cantilevered second end 144 of the plurality of radial arms 140. In the second position (not shown in figures), the plurality of small teeth elements 164 does not overlie on the second end 144 of the plurality of radial arms 140. The electrode implant assembly 120 could be selectively moved in either a first position or a second position by rotating the electrode implant assembly 120 relative to the electrode holder assembly 150.

Figure 8:
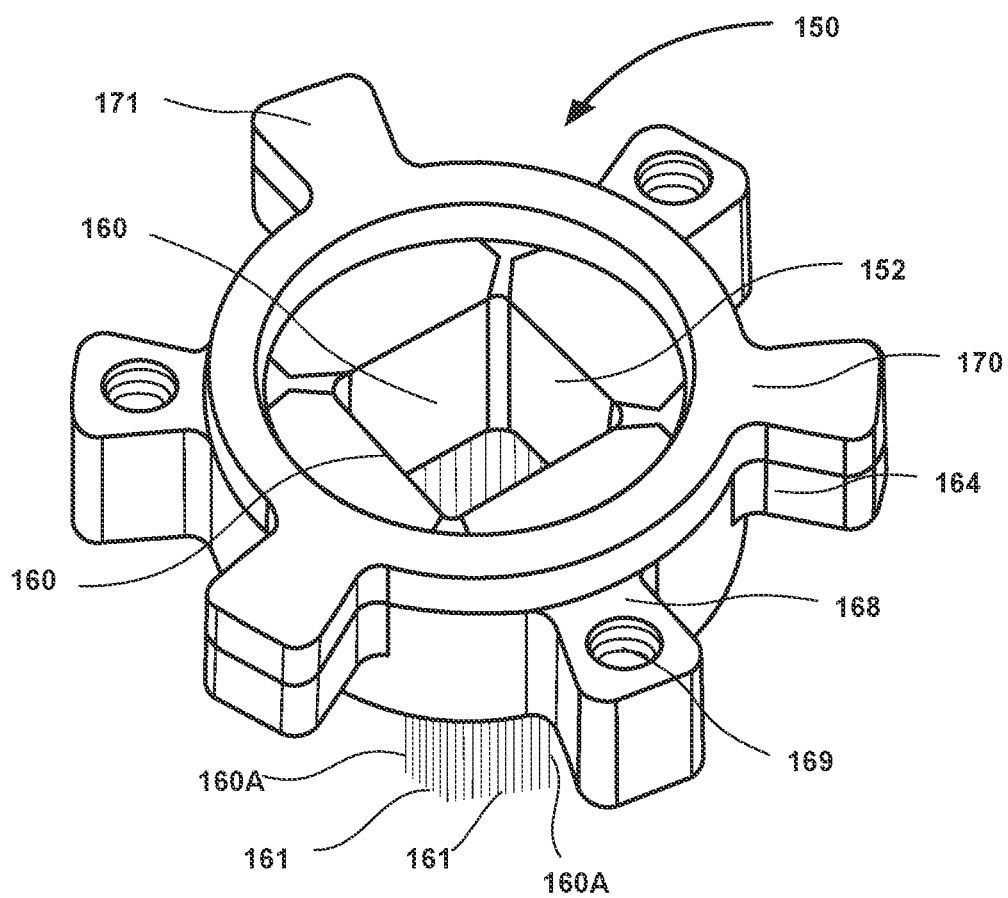
FIG. 8 illustrates a perspective view of an electrode holder assembly, according to another embodiment of the present invention.

FIG. 8 illustrates a perspective view of an electrode holder assembly 150, according to another embodiment of the present invention. The electrode holder assembly 150 comprises a plurality of flexible electrode array(s) 160 positioned in the central hole 152. As shown in FIG. 8, the number of the plurality of flexible electrode array(s) 160 positioned in the central hole 152 is two. However, it should be understood that more than two flexible electrode array(s) 160 can be positioned in the central hole 152.

Figure 9:
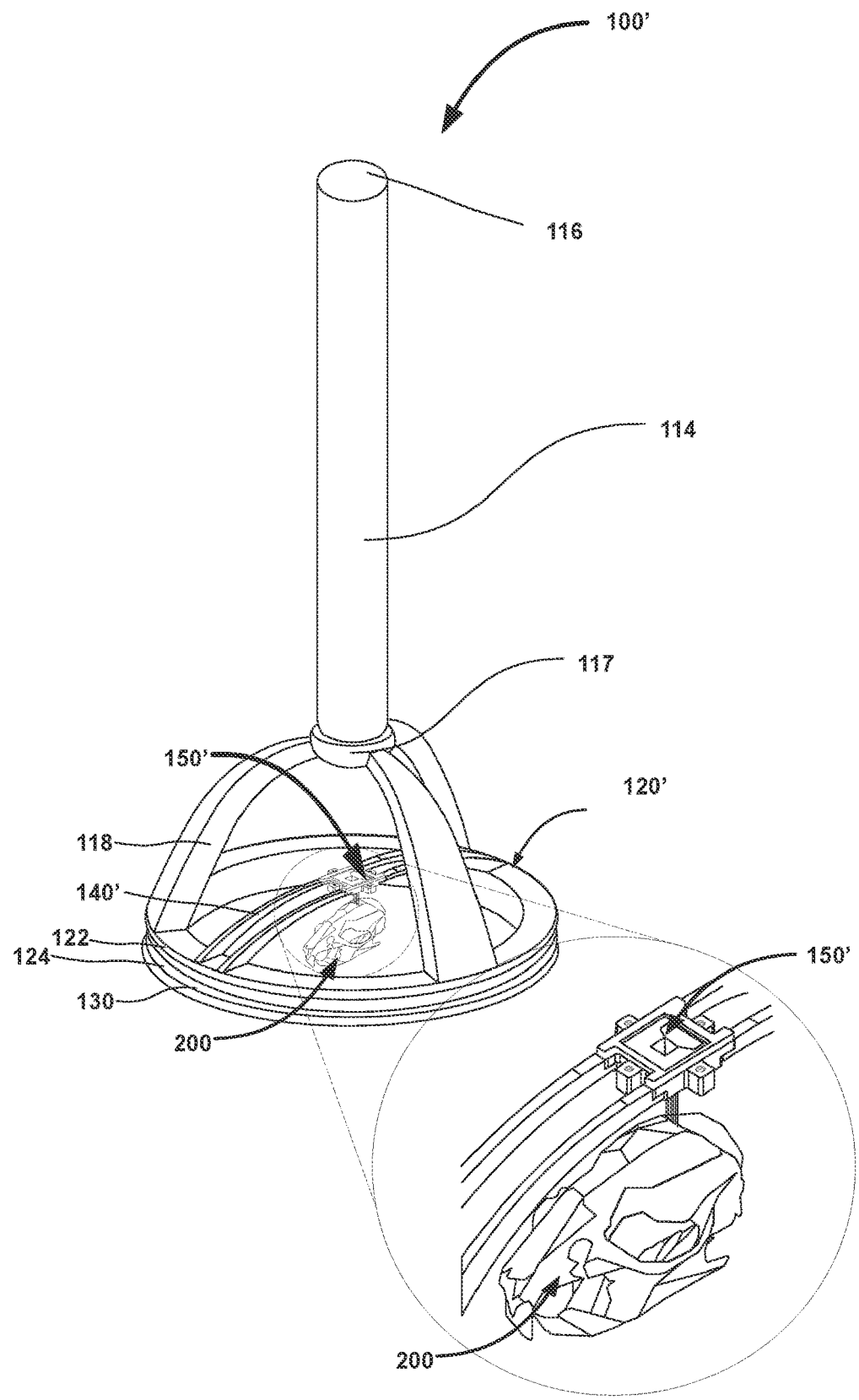
FIG. 9 illustrates a perspective view of an electrode implant tool removably holding an electrode holder assembly, according to another embodiment of the present invention.

FIG. 9 illustrates a perspective view of an electrode implant tool 100' removably holding an electrode holder assembly 150', according to another embodiment of the present invention. The electrode implant tool 100' and the electrode holder assembly 150' shown in FIG. 9-15 is pretty similar to the electrode implant tool 100 and the electrode holder assembly 150 shown in FIGS. 1-7 except for geometric modifications associated with the electrode implant tool 100 and the electrode holder assembly 150.

Figure 10:
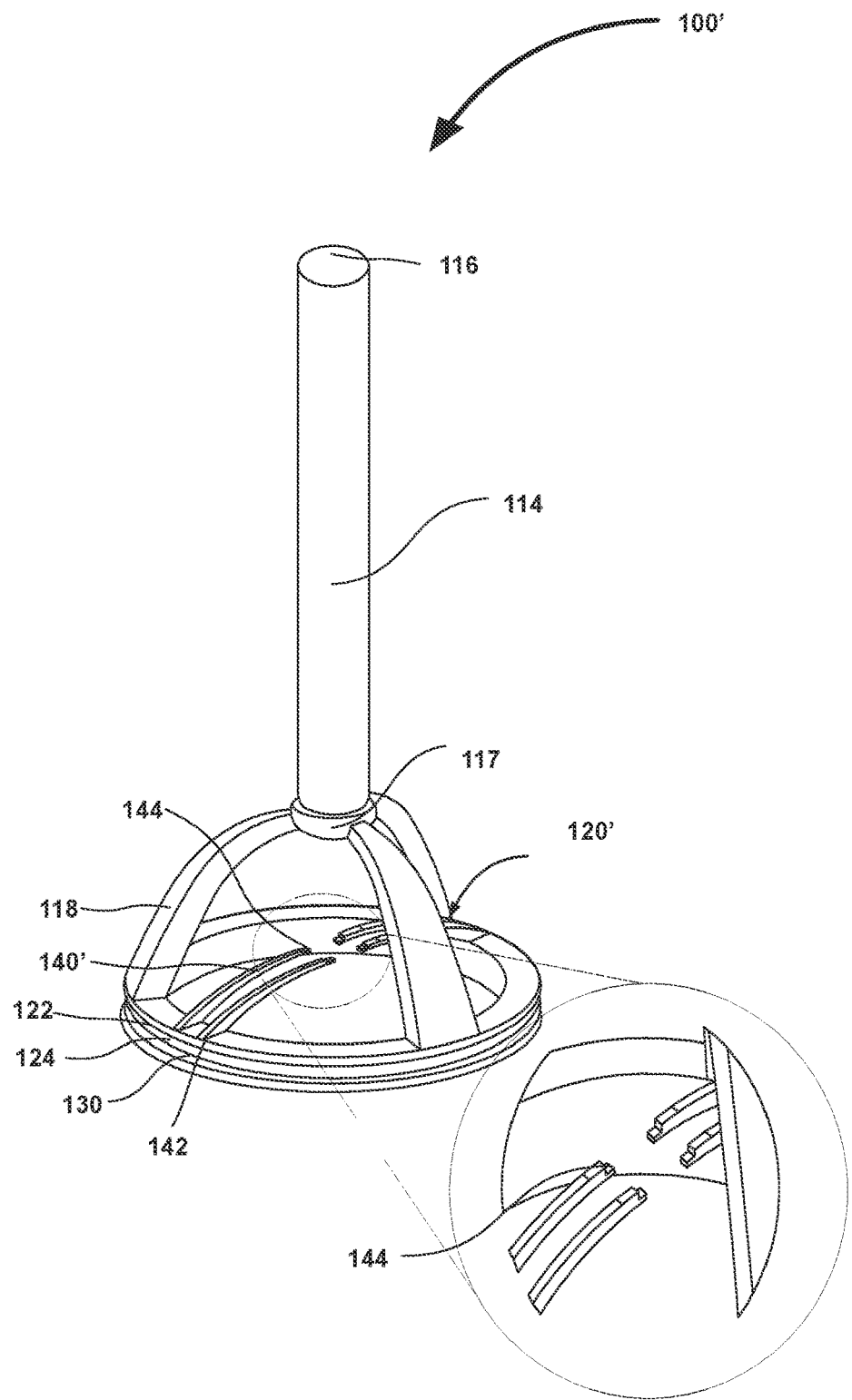
FIG. 10 illustrates a perspective view of the electrode implant tool of FIG. 9, wherein the electrode holder assembly is not shown for simplicity and ease of understanding.

As shown in FIG. 9, the electrode implant tool 100' comprises an elongate rod 114 comprising a first end 116 and an opposite second end 117. In an embodiment, the first end 116 of the elongate rod 114 is configured to be connected to a surgical manipulator 220 (not shown in figures), in another embodiment, the first end 116 of the elongate rod 114 is configured to be manually operated by an operator. The electrode implant tool 100' further comprises an electrode implant assembly 120' which comprises a plurality of attachment members 118 projecting from the elongate rod 114. The electrode implant assembly 120' further comprises a ring member 122 connected to each of the plurality of attachment members 118. The ring member 122 is dimensioned so that ring member 122 can easily fit the subject's head, in particular biological organ 200 (brain). A variable magnetic field generator 130 is arranged in the periphery 124 of the ring member 122 in an embodiment as seen in FIG. 1-2, the variable magnetic field source 130 is an electromagnetic coil 130. The electromagnetic coil 130 is configured to generate an adjustable magnetic field by controlling the electric current supplied to the electromagnetic coil 130. As seen in FIGS. 9-10, a plurality of radial arms 140' is connected to the ring member 122 of the electrode implant assembly 120'. Each of the plurality of radial arms 140' comprises a first end 142 connected to the ring member 122 of the electrode implant assembly 120' and an opposite cantilevered second end 144. Wherein the cantilevered second end 144 of the plurality of radial arms 140' are positioned such that the cantilevered second end 144 of the plurality of radial arms 140' is at higher elevation than the variable magnetic field generator 130 arranged in the periphery 124 of the ring member 122. As shown in FIG. 9, an electrode holder assembly 150' is removably positioned on the top of the cantilevered second end 144 of the plurality of radial arms 140' wherein the electrode holder assembly 150' will be described in greater detail in the below description.

Figure 11:
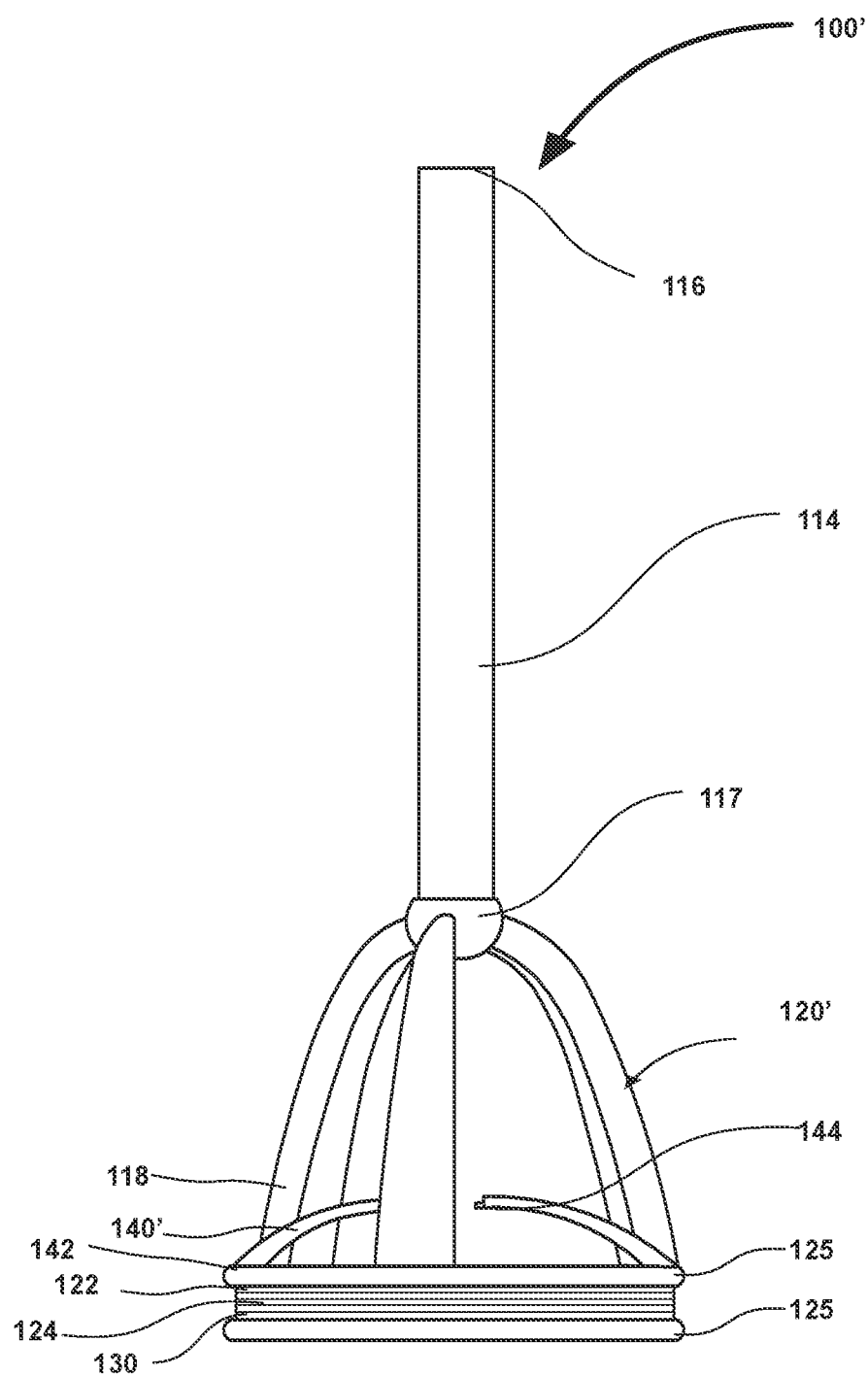
FIG. 11 illustrates a side view of the electrode implant tool of FIG. 10.
Figure 12:
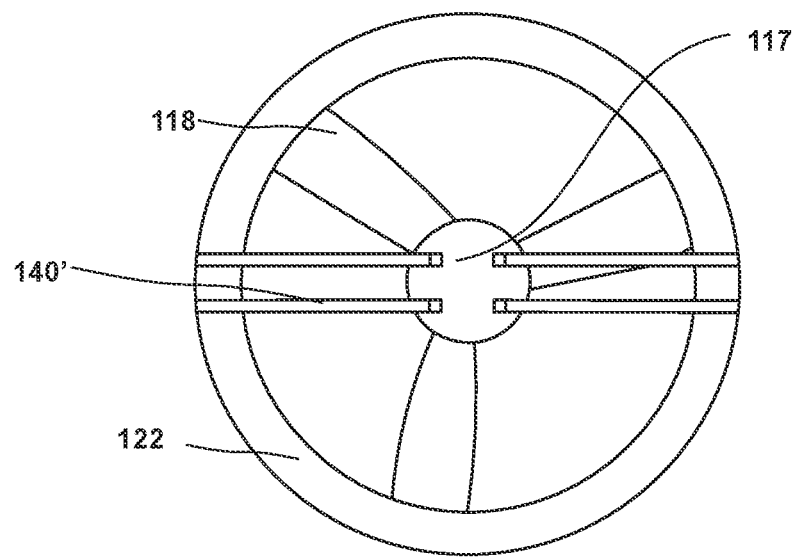
FIG. 12 illustrates a bottom view of the electrode implant tool of FIG. 10.

FIG. 10, FIG. 11, and FIG. 12 depict a perspective view, a side view, and a bottom view of the electrode implant tool 100' respectively. Referring to FIGS. 10-12, the periphery 124 of the ring member 122 comprises two flange portions 125 and the variable magnetic field generator 130 is arranged in a gap formed between the two flange portions 125 of the periphery 124 of the ring member 122. As seen in FIGS. 10-12, the plurality of attachment members 118 projecting from the elongate rod 114 is three in number. However, it should be understood that the plurality of attachment members 118 could be any arbitrary number of more than one. Further as seen in FIGS. 10-12, the plurality of radial arms 140' is two in number. However, it should be understood that the plurality of radial arms 140' could be any arbitrary number that is more than one. The variable magnetic field generator 130 is configured to generate an adjustable magnetic field by controlling the electric current supplied to the variable magnetic field generator 130. The elongate rod 114 is configured for removable connection with the surgical manipulator 220. An operator can removably connect the elongate rod 114 with the surgical manipulator 220 by any conventional method such as clamping, fastening, adhesive joining, and so on.

Figure 13:
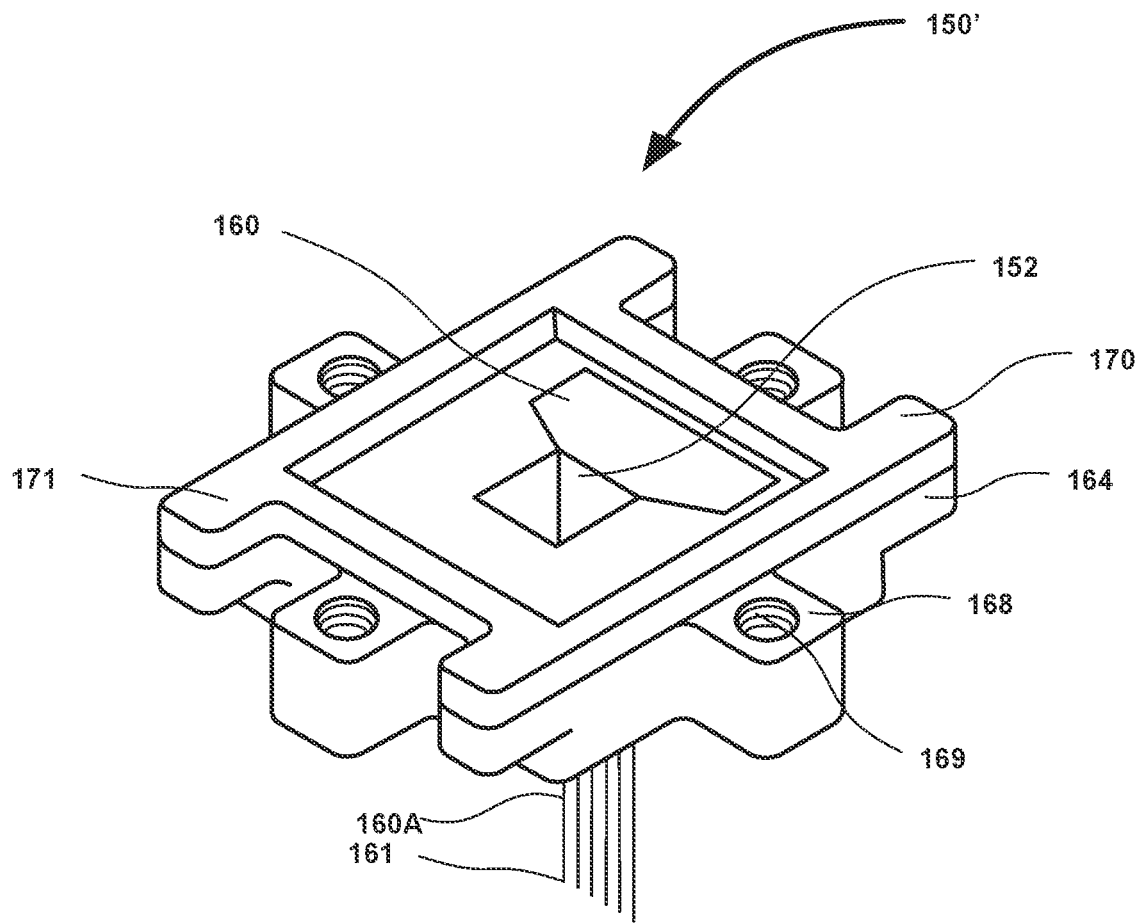
FIG. 13 illustrates a perspective view of the electrode holder assembly of FIG. 9, according to an embodiment of the present invention.
Figure 14:
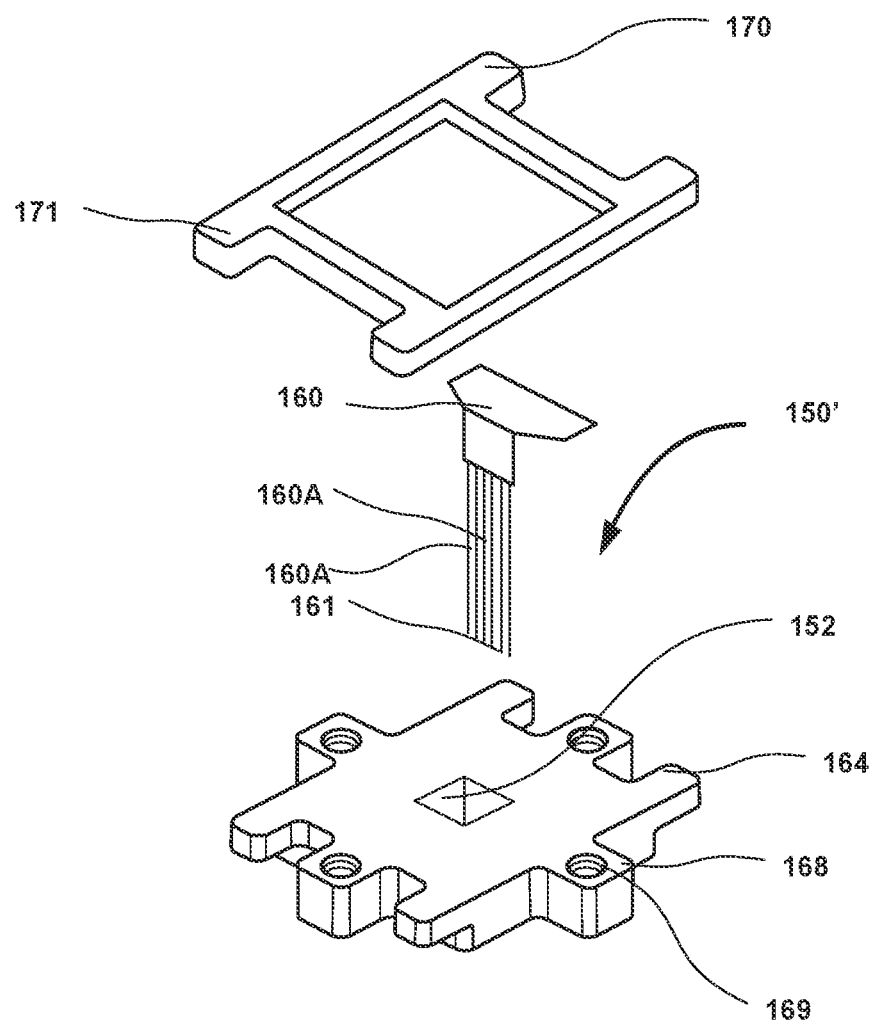
FIG. 14 illustrates an exploded view of the electrode holder assembly of FIG. 13.
Figure 15:
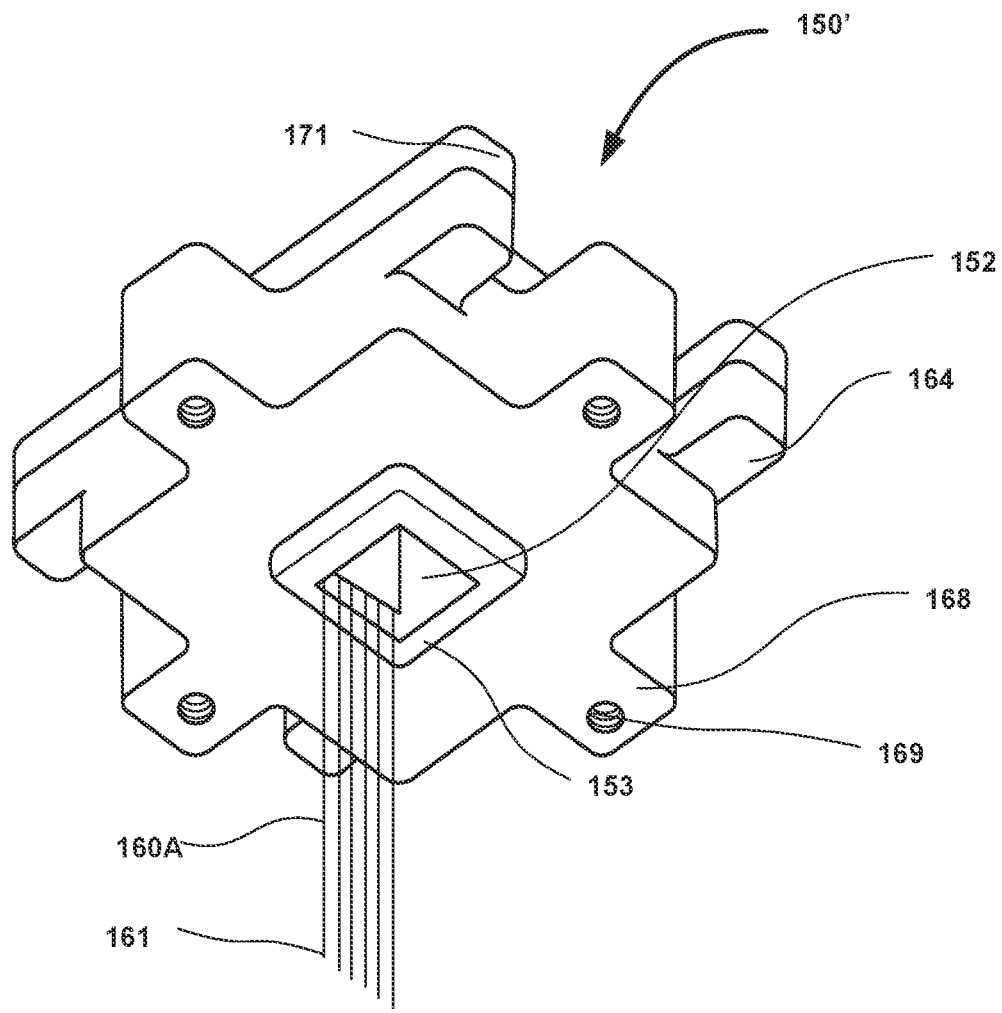
FIG. 15 illustrates a perspective bottom view of the electrode holder assembly of FIG. 13.

Referring to FIGS. 13-15, an electrode holder assembly 150' is removably positioned on the top of the cantilevered second end 144 of the plurality of radial arms 140'. The electrode holder assembly 150' comprises a plurality of small teeth elements 164 disposed of in the outer periphery of the electrode holder assembly 150'. The electrode holder assembly 150' further comprises a central hole 152 for holding at least one flexible electrode array 160. The central hole 152 is substantially square-shaped. However, it should be understood that the shape of the central hole 152 could have any shape including but not limited to: a circle, hexagon, triangle, and so on. An extruding element 153 is connected at the bottom of the electrode holder assembly 150'. A ferromagnetic metal retainer 170 is removably positioned on top of the electrode holder assembly 150'. The ferromagnetic metal retainer 170 comprises a plurality of flanges 171 which are movably positioned (overlies) on the top of the plurality of small teeth elements 164. The flexible electrode array(s) 160 includes a magnetic material positioned at an unsupported tip 161 of the flexible electrode array(s) 160. The magnetic material could include but is not limited to iron, nickel, cobalt, metal alloys, and so on. The flexible electrode array(s) 160 can have at least one shank 160A and each shank(s) 160A may have multiple channels. The upper part of the flexible electrode array(s) 160 is the printed pin out connectors which can be bent over and attached permanently to the upper surface of the electrode holder assembly 150'. The shank(s) 160A extend downward through the central hole 152 of the electrode holder assembly 150'. The electrode holder assembly 150' further comprises a plurality of large teeth elements 168 disposed of in the outer periphery of the electrode holder assembly 150'. Each of the plurality of large teeth elements 168 comprises a fastener hole 169 to removably connect the plurality of large teeth elements 168 with a downstream data acquisition system (not shown in figures). The electrode holder assembly 150' and the ferromagnetic metal retainer 170 are substantially quadrilateral in shape as seen in FIG. 14, however other shapes should also be envisioned including but not limited to triangular, square, hexagon, circle, octagon, and so on.

Referring to FIGS. 9-15, the electrode implant assembly 120' could be selectively moved relative to the electrode holder assembly 150' to bring the electrode implant assembly 120' in either a first position (FIG. 9) or a second position (not shown in figures).

In the first position as shown in FIG. 9, each of the plurality of small teeth elements 164 is positioned on top of the cantilevered second end 144 of one of the plurality of radial arms 140' such that the plurality of small teeth elements 164 at least substantially overlies on the second end 144 of the plurality of radial arms 140' such that the plurality of small teeth elements 164 at least partially contacts the second end 144 of the plurality of radial arms 140'. In the second position (not shown in figures), the plurality of small teeth elements 164 does not overlie on the second end 144 of the plurality of radial arms 140'. The electrode implant assembly 120' could be selectively moved in either a first position or a second position by slidably moving the electrode implant assembly 120' relative to the electrode holder assembly 150'.

Referring to FIGS. 1-15, an exemplary method of implanting flexible electrode array(s) 160 using electrode implant tool (100, 100') according to various embodiments of the present invention, will now be described in detail in the below description with respect to steps S1-S17 mentioned below.

S1. Permanently attach flexible electrode array(s) 160 to the electrode holder assembly (150, 150') using glue or other conventional mechanisms.

S2. Start with a standard surgical procedure for cranial implantation. Make a square cranial opening (3-5 mm) on the subject's skull at the ideal position.

S3. (a) while using electrode implant tool 100 (FIG. 2), use the surgical manipulator 220 on the stereotaxic surgery apparatus to tightly grab the rotating tube 115 of the elongate rod 114. Make sure the set screw 115A (not shown in figures) on the rotating tube 115 is tightened. At this point, the electrode implant tool 100 is rigidly attached to the surgical manipulator 220.

(b) while using electrode implant tool 100' (FIG. 9), use the surgical manipulator 220 on the stereotaxic surgery apparatus to tightly grab the elongate rod 114. At this point, the electrode implant tool 100' is rigidly attached to the surgical manipulator 220.

S4. Assemble the electrode implant tool (100, 100'), the electrode holder assembly (150, 150'), the flexible electrode array(s) 160, and the ferromagnetic metal retainer 170 as depicted in FIG. 1 or FIG. 9, and apply a weak current in the variable magnetic field generator 130 to generate a magnetic field strong enough to pull the ferromagnetic metal retainer 170 downward and fix electrode holder assembly (150, 150') in place.

S5. Use the surgical manipulator 220 to move the electrode implant tool (100, 100') so that the unsupported tip 161 of the flexible electrode array(s) 160 are above the cranial window.

S6. Increase the current in the variable magnetic field generator 130 to generate a strong magnetic field pulling the unsupported tip 161 of the flexible electrode array(s) 160 downwards. At this point the whole flexible electrode array(s) 160 is right above the surface of biological organ 200 (brain). The unsupported tip 161 of the flexible electrode array(s) 160 is positioned at higher elevation than the variable magnetic field generator 130 arranged in the periphery 124 of the ring member 122, thus the unsupported tip 161 of the flexible electrode array(s) 160 is being pulled downwards.

S7. Slowly lower the electrode implant tool (100, 100') downwards using the surgical manipulator 220 and let the flexible electrode array(s) 160 penetrate into the biological organ 200 (brain). The direction of the downwards motion will be parallel to the flexible electrode array(s) 160 so that there will be no relative horizontal movement between the flexible electrode array(s) 160 and the biological organ 200 (brain). This minimizes the horizontal "Cutting" damage made by the electrode insertion.

S8. Once the ideal depth is reached, wait 5-10 minutes for the flexible electrode array(s) 160 to settle before reducing the electric current in the variable magnetic field generator 130. After reducing the current, the magnetic field will be too weak to move the flexible electrode array(s) 160 in the biological organ 200 (brain) but still strong enough to pull the ferromagnetic metal retainer 170 and keep the electrode holder assembly (150, 150') in place.

S9. Keep lowering the electrode implant tool (100, 100'), until the electrode holder assembly (150, 150') sit on top of the skull and the extruding element 153 at the bottom of the electrode holder assembly (150, 150') extended into the cranial window. Since the flexible electrode array(s) 160 is longer than the ideal depth, and the magnetic field is now not strong enough to pull the flexible electrode array(s) 160 in the biological organ 200 (brain), the upper part of the shank(s) 160A will curve inside the central hole 152 of the electrode holder assembly (150, 150'). This is important since the extra length will allow the implanted shank(s) 160A move along the biological organ 200 (brain).

S10. Attach the plurality of large teeth elements 168 of electrode holder assembly (150, 150') to the skull using dental cement.

S11. Using a small piece of bio-compatible material (e.g., glass prism, silicon rubber, etc) to fill the central hole 152 of electrode holder assembly (150, 150'). Fix the filling with bio-compatible glue (e.g., 3M vetbond) and seal with dental cement.

S12. Completely remove the current in the variable magnetic field generator 130, thus remove the magnetic field.

S13. Remove the ferromagnetic metal retainer 170.

S14. Lower the electrode implant tool (100, 100') by a very slight distance and the electrode implant tool (100, 100') should be detached from the electrode holder assembly (150, 150'), which is now fixed on the skull.

S15. (a) while using the electrode implant tool 100 (FIG. 1), loosen the set screw 115A (not shown in figures) on the rotation tube 115 of the elongate rod 114 and carefully rotate the electrode implant tool 100 until the plurality of small teeth elements 164 does not overlie on the second end 144 of the plurality of radial arms 140. In this position, the plurality of small teeth elements 164 does not contact the second end 144 of the plurality of radial arms 140

(b) while using the electrode implant tool 100' (FIG. 9), carefully move (i.e slide) the electrode implant tool 100' in a horizontal (transverse) direction until the plurality of small teeth elements 164 does not overlie on the second end 144 of the plurality of radial arms 140'. In this position, the plurality of small teeth elements 164 does not contact the second end 144 of the plurality of radial arms 140'.

S16. Lift the electrode implant tool (100, 100') away and leave the implanted flexible electrode array(s) 160 with electrode holder assembly (150, 150') on the skull.

S17. Apply more dental cement between the bottom of the electrode holder assembly (150, 150') and the skull surface to strongly fix the electrode holder assembly (150, 150') in place.

In another embodiment (not shown in figures), a magnetic material is disposed of at least substantially in the electrode holder assembly (150, 150') such that the variable magnetic field generator 130 can magnetically attract the magnetic material in the electrode holder assembly (150, 150'). Thus, in this particular embodiment, the ferromagnetic metal retainer 170 is not required for effectively implanting at least one flexible electrode array(s) 160 in a biological organ 200.

In another embodiment (not shown in figures), the electrode holder assembly (150, 150') is made of a transparent material to allow visual inspection of the tissue of biological organ 200 (brain) under the electrode holder assembly (150, 150') after implantation of the flexible electrode array(s) 160.

The electrode implant tool (100, 100') of the present invention includes various components, parts thereof may be configured in many different shapes, sizes and using different kinds of medical-grade biocompatible materials, including but not limited to metals, plastics, ceramics, composites, polymers, rubber, silicone and one should not construed these aspects to be a limiting factor for the invention disclosed herein. The electrode implant tool (100, 100') of the present invention has the potential application to the fields of neuroscience research, brain-machine interface, and clinical applications.

It should be understood that the various components and assemblies of the various embodiments of the electrode implant tool (100, 100') of the present invention are similar and interchangeable. It is obvious to the one skilled in the art that the various components and assemblies of the electrode implant tool (100, 100') of one embodiment of the present invention could be considered for other embodiments with little or no variation.

It should be understood according to the preceding description of the present invention that the same is susceptible to changes, modifications and adaptations, and that the said changes, modifications and adaptations fall within scope of the appended claims.

What is claimed is:

1. A system for implanting at least one flexible electrode array (160) in a biological organ (200), the system comprising an electrode implant tool (100,100') comprising:
    an elongate rod (114) comprising a first end (116) and an opposite second end (117);
    an electrode implant assembly (120, 120') comprising a plurality of attachment members (118) projecting from the second end (117) of the elongate rod (114), wherein the electrode implant assembly (120) further comprises a ring member (122) connected to each of the plurality of attachment members (118);
    a variable magnetic field generator (130) arranged in a periphery (124) of the ring member (122);
    a plurality of radial arms (140, 140'), wherein each of the plurality of radial arms (140, 140') comprises a first end (142) connected to each of the plurality of attachment members (118) of the electrode implant assembly (120) and an opposite cantilevered second end (144), wherein the cantilevered second end (144) of the plurality of radial arms (140) is positioned such that the cantilevered second end (144) of the plurality of radial arms (140) is at a higher elevation than the variable magnetic field generator (130) arranged in the periphery (124) of the ring member (122);
    an electrode holder assembly (150,150') removably positioned on the top of the cantilevered second end (144) of the plurality of radial arms (140, 140'), wherein the electrode holder assembly (150,150') comprises a plurality of small teeth elements (164), and a plurality of large teeth elements (168) disposed of in the outer periphery of the electrode holder assembly (150, 150'), and wherein the thickness of the plurality of large teeth elements (168) is set larger than the thickness of the small teeth elements (164);
    wherein the electrode holder assembly (150,150') further comprises a central hole (152) for holding at least one flexible electrode array(s) (160); and
    wherein the flexible electrode array(s) (160) includes a magnetic material positioned at an unsupported tip (161) of the flexible electrode array(s) (160).

2. The system for implanting at least one flexible electrode array (160) in a biological organ (200) according to claim 1, wherein the electrode implant assembly (120, 120') is selectively moved relative to the electrode holder assembly (150, 150') to bring the electrode implant assembly (120, 120') in either a first position or a second position.

3. The system for implanting at least one flexible electrode array (160) in a biological organ (200) according to claim 1, wherein in the first position, each of the plurality of small teeth elements (164) is positioned on top of the cantilevered second end (144) of one of the plurality of radial arms (140, 140') such that the plurality of small teeth elements (164) at least substantially overlies on the second end (144) of the plurality of radial arms (140, 140'); and wherein in the second position, the plurality of small teeth elements (164) does not overlie on the second end (144) of the plurality of radial arms (140, 140').

4. The system for implanting at least one flexible electrode array (160) in a biological organ (200) according to claim 2, wherein the electrode implant assembly (120) can be is selectively moved in either the first position or the second position by rotating the electrode implant assembly (120) relative to the electrode holder assembly (150).

5. The system for implanting at least one flexible electrode array (160) in a biological organ (200) according to claim 2, wherein the electrode implant assembly (120') is selectively moved in either the first position or the second position by slidably moving the electrode implant assembly (120') relative to the electrode holder assembly (150').

6. The system for implanting at least one flexible electrode array (160) in a biological organ (200) according to claim 1, wherein the electrode holder assembly (150) is substantially circular in shape.

7. The system for implanting at least one flexible electrode array (160) in a biological organ (200) according to claim 1, wherein the electrode holder assembly (150') is substantially quadrilateral in shape.

8. The system for implanting at least one flexible electrode array (160) in a biological organ (200) according to claim 1, wherein the first end (116) of the elongate rod (114) is configured to be connected to a surgical manipulator (220).

9. The system for implanting at least one flexible electrode array (160) in a biological organ (200) according to claim 1, wherein the biological organ (200) is a brain.

10. The system for implanting at least one flexible electrode array (160) in a biological organ (200) according to claim 1, wherein the elongate rod (114) comprises a rotation tube (115).

11. The system for implanting at least one flexible electrode array (160) in a biological organ (200) according to claim 1, wherein the periphery (124) of the ring member (122) comprises two flange portions (125); and wherein the variable magnetic field generator (130) is arranged in a gap formed between the two flange portions (125) of the periphery (124) of the ring member (122).

12. The system for implanting at least one flexible electrode array (160) in a biological organ (200) according to claim 1, wherein each of the plurality of large teeth elements (168) comprises a fastener hole (169) to removably connect the plurality of large teeth elements (168) with a downstream data acquisition system.

13. The system for implanting at least one flexible electrode array (160) in a biological organ (200) according to claim 1, wherein the variable magnetic field generator (130) is configured to generate an adjustable magnetic field by controlling the electric current supplied to the variable magnetic field generator (130).

14. The system for implanting at least one flexible electrode array (160) in a biological organ (200) according to claim 1, wherein the variable magnetic field generator (130) is selected from a group consisting of electromagnetic coil, current carrying conductor.

15. The system for implanting at least one flexible electrode array (160) in a biological organ (200) according to claim 1, wherein a ferromagnetic metal retainer (170) is removably positioned on top of the electrode holder assembly (150, 150').

16. The system for implanting at least one flexible electrode array (160) in a biological organ (200) according to claim 1, wherein a magnetic material is disposed at least substantially in the electrode holder assembly (150, 150').

17. The system for implanting at least one flexible electrode array (160) in a biological organ (200) according to claim 1, wherein the electrode holder assembly (150,150') further comprises an extruding element (153) connected at the bottom of the electrode holder assembly (150,150') and configured to extend into a cranial window or opening made during a standard surgical procedure of cranial implantation.

* * * * *